United States Patent [19]

Lin

[11] Patent Number: 5,533,049
[45] Date of Patent: Jul. 2, 1996

[54] METHOD, DIGITAL SIGNAL PROCESSING MODULE AND SYSTEM FOR EFFICIENTLY SELECTING A PRE-EMPHASIS FILTER DURING LINE PROBING

[75] Inventor: Jingdong Lin, Norwood, Mass.

[73] Assignee: Motorola, Inc., Schaumburg, Ill.

[21] Appl. No.: 280,919

[22] Filed: Jul. 27, 1994

[51] Int. Cl.[6] ................................................. H04B 1/38
[52] U.S. Cl. ........................ 375/222; 375/224; 375/285; 375/296; 375/350; 348/613; 370/17
[58] Field of Search ................................. 375/222, 224, 375/225, 229, 230, 259, 285, 296, 346, 347, 350; 364/724.19, 724.01; 348/607, 608, 613; 455/43, 62; 379/347, 93, 97, 98; 370/17

[56] References Cited

U.S. PATENT DOCUMENTS

| | | | |
|---|---|---|---|
| 5,008,903 | 4/1991 | Betts et al. | 375/296 |
| 5,048,054 | 9/1991 | Eyuboglu et al. | 375/222 |
| 5,475,711 | 12/1995 | Betts et al. | 375/222 |

Primary Examiner—Stephen Chin
Assistant Examiner—Amanda T. Le
Attorney, Agent, or Firm—Darleen J. Stockley

[57] ABSTRACT

The present invention provides a pre-emphasis selection method, digital signal processing module and digital communication system that use computations based on channel spectrum measurements for efficient, non-complex determination of a pre-emphasis filter index. By avoiding the complex computations, a near optimal selection of a pre-emphasis filter with robust performance is achieved with relatively simple calculations.

15 Claims, 5 Drawing Sheets

FIG. 4    400

METHOD, DIGITAL SIGNAL PROCESSING MODULE AND SYSTEM FOR EFFICIENTLY SELECTING A PRE-EMPHASIS FILTER DURING LINE PROBING

FIELD OF THE INVENTION

This invention relates generally to data communication equipment, and more particularly, to data communication equipment working on a noisy telephone channel.

BACKGROUND

In the signal transmission over a noisy channel, when the dominant channel noise is independent of the transmitted signal, a flat transmit spectrum results in an optimal performance. If the channel noise is signal dependant, performance improvements can be obtained by adding spectral pre-emphasis. Pre-emphasis tends to reduce the average signal amplitudes before the signal dependent impairments, thereby improving performance.

Modems often utilize line probing to select one of a plurality of frequency bands for optimal transmission. A line probing signal processor measures characteristics of the channel based upon a received line probing signal and selects the frequency band to be used for receiving the modulated signal from a remote device based on the characteristics of the channel. The measured channel characteristics are also used to determine a suitable pre-emphasis filter which will be used in the signal transmission.

In the standard of V.34 modem, eleven different kinds of pre-emphasis filters are defined. Thus, there is a need for a method for selecting a pre-emphasis filter during line-probing wherein the method provides efficient filter selection with minimized computation.

BRIEF DESCRIPTIONS OF THE DRAWINGS

Figure 4:
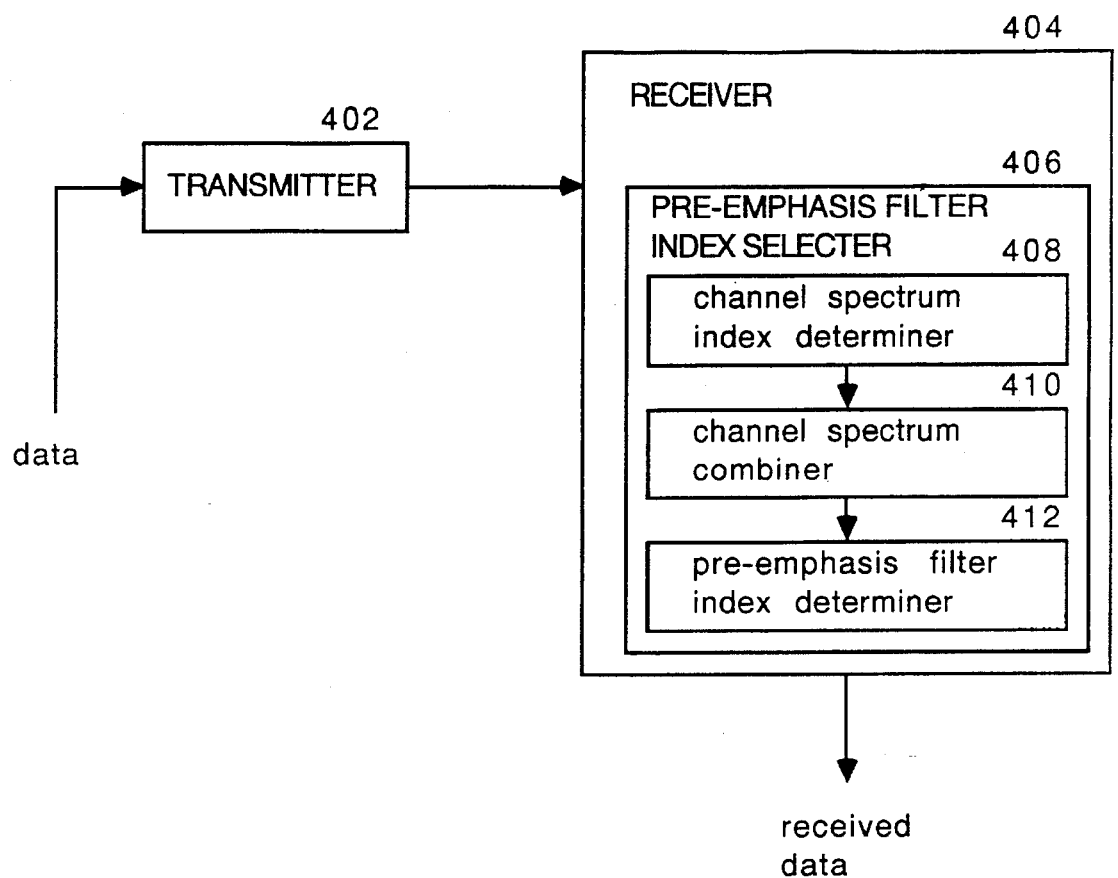

FIG. 4 is a block diagram of a digital communication system having a transmitter and receiver wherein the receiver has a characteristic spectrum based pre-emphasis filter index selector for selecting a pre-emphasis filter index based on a channel characteristic spectrum measurement for each of a plurality of predetermined pairs of carrier frequencies and baud rates in accordance with the present invention.

Figure 5:
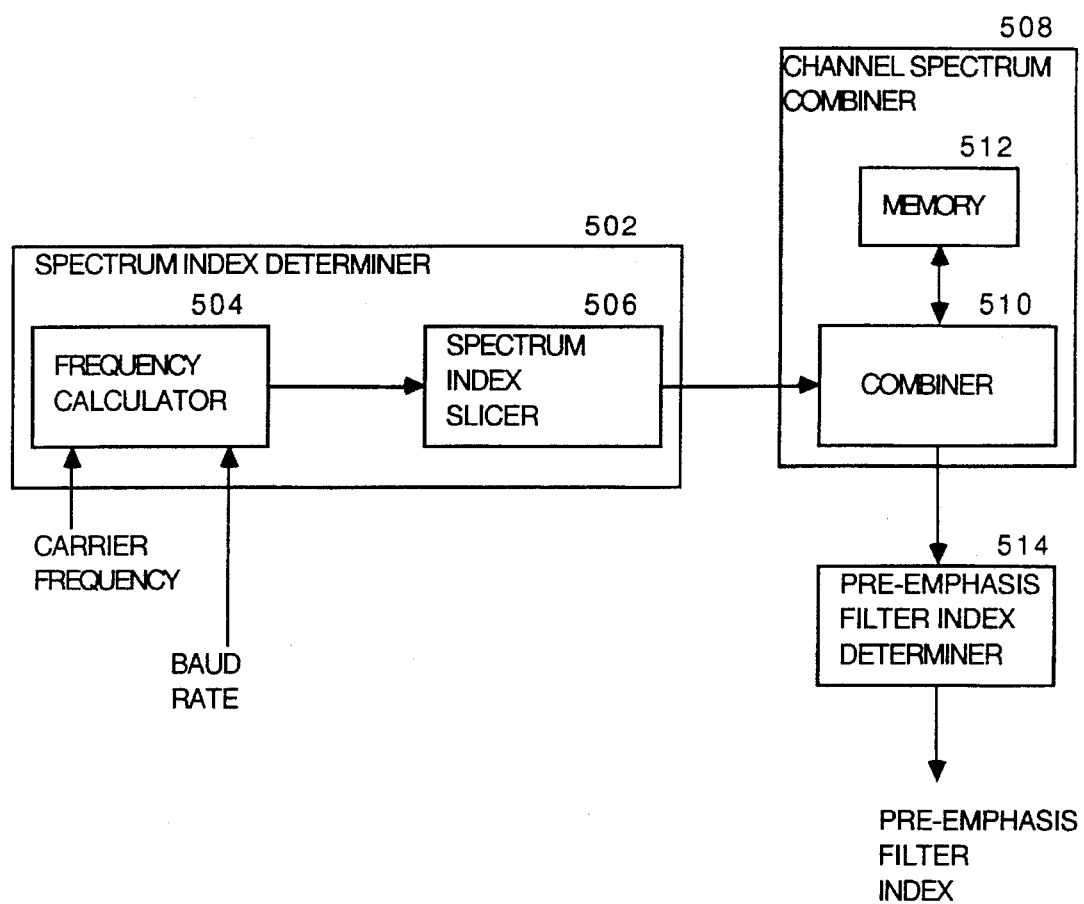

FIG. 5 is a block diagram of the method for selecting a pre-emphasis filter by a digital signal processing module in a line probing modem having at least a channel spectrum measurement in accordance with the present invention.

DETAILED DESCRIPTION OF A PREFERRED EMBODIMENT

The present invention provides a pre-emphasis selection method that uses computations based on channel spectrum measurements, thereby avoiding the complex computations required with signal to noise ratio computations and achieving an optimal selection of a pre-emphasis filter with robust performance.

Figure 1:
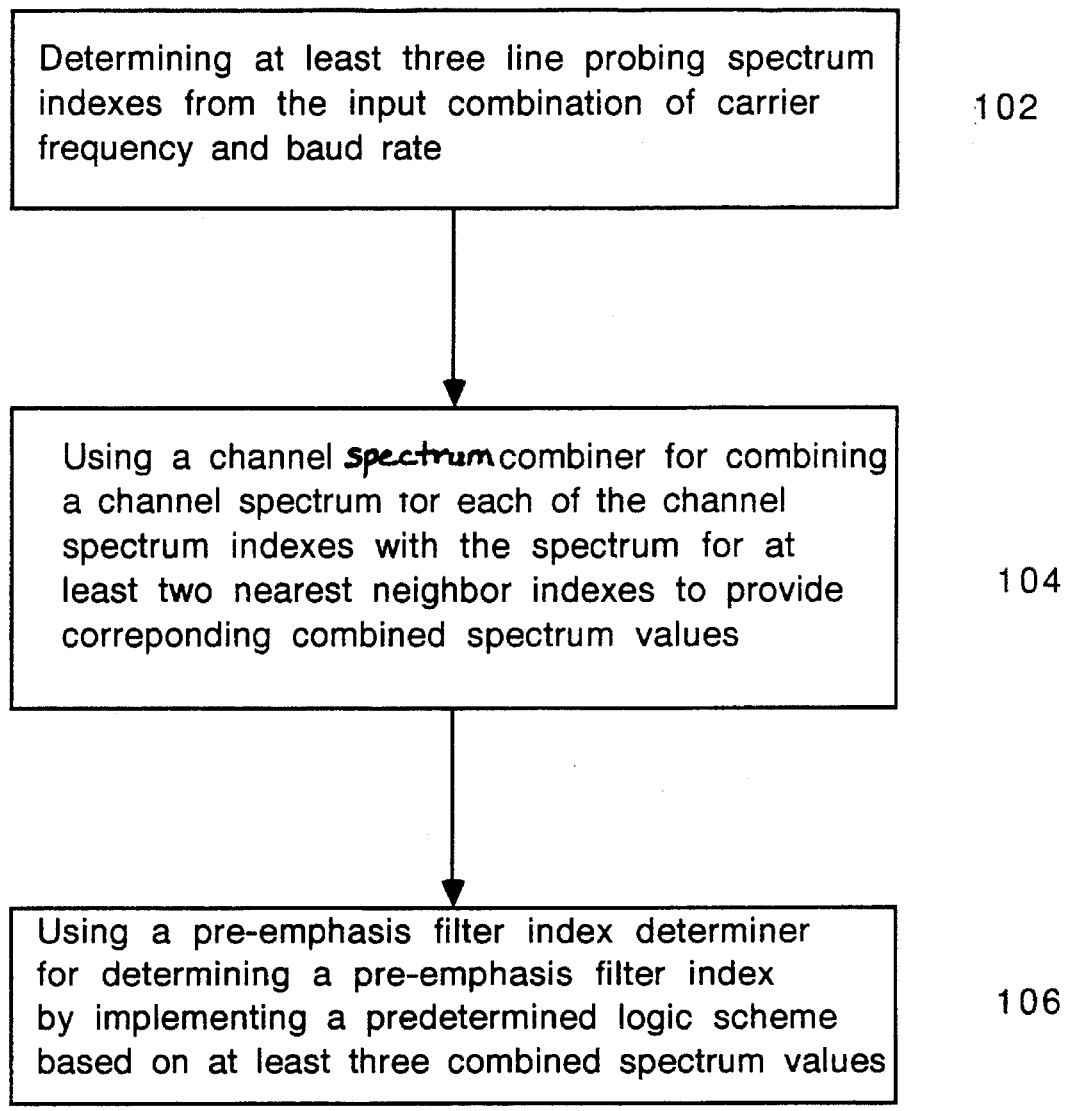
FIG. 1 is a flow chart of an embodiment of steps for a method for selecting a pre-emphasis filter by a digital signal processor in a line probing modem having a channel characteristic spectrum measurement for each of a plurality of predetermined pairs of carrier frequencies and baud rates in accordance with the present invention.

FIG. 1, numeral 100, is a flow chart of an embodiment of steps for a method for selecting a pre-emphasis filter in a line probing modem having a channel characteristic spectrum measurement for each of a plurality of predetermined pairs of carrier frequencies and baud rates in accordance with the present invention. The method includes the steps of: A) determining at least three corresponding channel spectrum indexes from the calculation based on a carrier frequency and a baud rate (102), B) using a channel spectrum combiner for combining a channel spectrum for each of the channel spectrum indexes with the channel spectrum for at least two nearest neighbor indexes to provide corresponding combined spectrum values (104), and C) using a pre-emphasis filter index determiner for determining a pre-emphasis filter index by implementing a predetermined logic scheme based on combined spectrum values associated with each combination (106).

For a measured channel spectrum via line probing, typically there are 25 tones after four missing tones are recovered: tone 1 at 150 Hz with index 1, tone 2 at 300 Hz with index 2, tone 3 at 450 Hz with index 3, tone 4 at 600 Hz with index 4, tone 5 at 740 Hz with index 5, tone 6 at 900 Hz with index 6, tone 7 at 1050 Hz with index 7, tone 8 at 1200 Hz with index 8, tone 9 at 1350 Hz with index 9, tone 10 at 1500 Hz with index 10, tone 11 at 1650 Hz with index 11, tone 12 at 1800 Hz with index 12, tone 13 at 1950 Hz with index 13, tone 14 at 2100 Hz with index 14, tone 15 at 2250 Hz with index 15, tone 16 at 2400 Hz with index 16, tone 17 at 2550 Hz with index 17, tone 18 at 2700 Hz with index 18, tone 19 at 2850 Hz with index 19, tone 20 at 3000 Hz with index 20, tone 21 at 3150 Hz with index 21, tone 22 at 3300 Hz with index 22, tone 23 at 3450 Hz with index 23, tone 24 at 3600 Hz with index 24, and tone 25 at 3750 Hz with index 25. Index 0 indicates that no pre-emphasis filter is utilized.

In a typical implementation, the predetermined scheme typically includes, for determining three line probing frequencies based on each of a plurality of predetermined pairs of carrier frequencies, $f_c$, and baud rates, Q, selecting a corresponding low frequency $f_1=f_c-\beta*Q/2$, where $\beta$ is a predetermined scaling factor, selecting a corresponding medium frequency $f_2=f_c$, and selecting a corresponding high frequency $f_3=f_c+\beta*Q/2$. For low, medium or high frequency, a line probing frequency with the nearest value from the set { 150 Hz, 300 Hz, 450 Hz, 600 Hz, 750 Hz, 900 Hz, 1050 Hz, 1200 Hz, 1350 Hz, 1500 Hz, 1650 Hz, 1800 Hz, 1950 Hz, 2100 Hz, 2250 Hz, 2400 Hz, 2550 Hz, 2700 Hz, 2850 Hz, 3000 Hz, 3150 Hz, 3300 Hz, 3450 Hz, 3600 Hz, 3750 Hz} is selected, and the corresponding channel spectrum index, 1 for 150 Hz, 2 for 300 Hz and so on, is determined as spectrum indexes i1, i2 and i3.

For each of the three spectrum indexes, the corresponding combined spectrum value is formed as S1, S2, and S3. Then the predetermined logic scheme uses S1, S2, and S3 to determine a pre-emphasis filter index, as described more fully below.

Generally, the characteristic channel spectra for each of the spectrum indexes and the characteristic spectra for at least two nearest neighbor spectrum indexes each comprise a predetermined channel response at the respective frequency that has been stored in a memory of a digital signal processing module.

The step of using a channel characteristic spectrum combiner for combining a characteristic spectrum for each spectrum index with the characteristic spectrum for at least two nearest neighbor indexes to provide corresponding combined spectrum values generally includes weighted summation of the channel spectrum for the spectrum index and at least the two nearest neighbor indexes to provide at least three combined values, S1, S2, and S3. Clearly, an average, or another equivalent comparison value, of the added frequencies may also be used.

Figure 2:
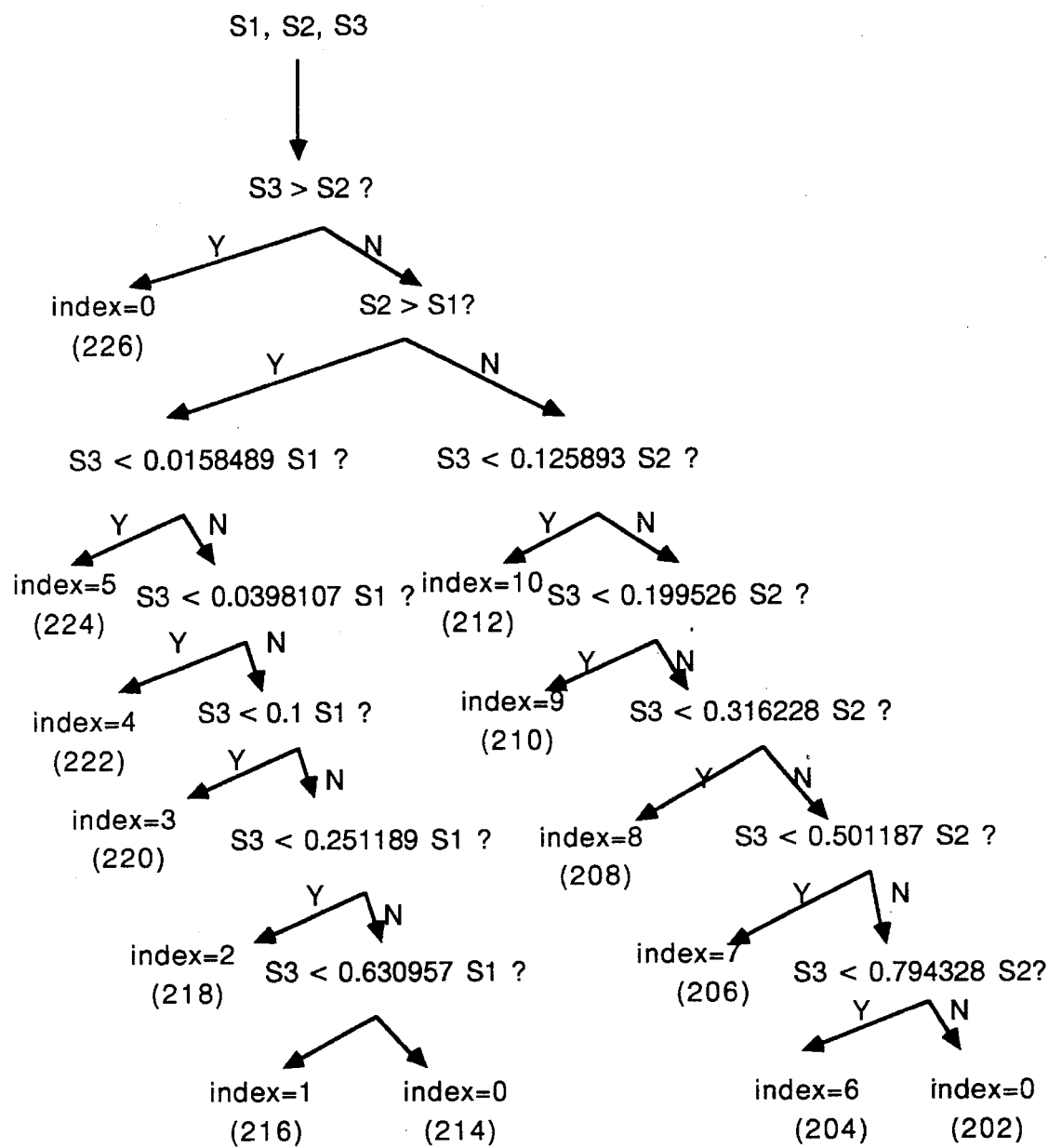
FIG. 2 is a flow chart setting forth steps for implementation of the predetermined logic scheme based on the combined spectrum values in accordance with the present invention wherein the combined spectrum values are predetermined ranges associated with S1, S2 and S3

FIG. 2, numeral 200, is a flow chart setting forth steps for implementation of the predetermined logic scheme based on the combined spectrum values comprises the following steps and wherein the combined spectrum values are predetermined ranges associated with combination of S1, S2 and S3 in accordance with the present invention. The steps include: A) if S3 is larger than S2 and S2 is larger than S1, for a range S3/S2 of approximately 0.79 and greater, an approximate loss of 0–1 dB, a compensation of approximately 0 dB, selecting the pre-emphasis filter with index 0 (202); B) if S3 is larger than S2 and S2 is larger than S1, for a range S3/S2 of approximately 0.5–0.79, an approximate loss of 1–3 dB, a compensation of approximately 1 dB, selecting the pre-emphasis filter with index 6 (204); C) if S3 is larger than S2 and S2 is larger than S1, for a range S3/S2 of approximately 0.32–0.50, an approximate loss of 3–5 dB, a compensation of approximately 2 dB, selecting the pre-emphasis filter with index 7 (206); D) if S3 is larger than S2 and S2 is larger than S1, for a range S3/S2 of approximately 0.20–0.32, an approximate loss of 5–7 dB, a compensation of approximately 3 dB, selecting the pre-emphasis filter with index 8 (208); E) if S3 is larger than S2 and S2 is larger than S1, for a range S3/S2 of approximately 0.13–0.20, an approximate loss of 7–9 dB, a compensation of approximately 4 dB, selecting the pre-emphasis filter with index 9 (210); F) if S3 is larger than S2 and S2 is larger than S1, for a range S3/S2 of approximately 0.13 and less, an approximate loss of at least 9 dB, a compensation of at least 5 dB, selecting the pre-emphasis filter with index 10 (212); G) if S3 is larger than S2 and S2 is less than S1, for a range S3/S1 of approximately 0.63 and greater, an approximate loss of 0–2 dB, a compensation of approximately 0 dB, selecting the pre-emphasis filter with index 0 (214); H) if S3 is larger than S2 and S2 is less than S1, for a range S3/S1 of approximately 0.25–0.63, an approximate loss of 2–6 dB, a compensation of approximately 2 dB, selecting the pre-emphasis filter with index 1 (216); I) if S3 is larger than S2 and S2 is less than S1, for a range S3/S1 of approximately 0.1–0.25, an approximate loss of 6–10 dB, a compensation of approximately 4 dB, selecting the pre-emphasis filter with index 2 (218); J) if S3 is larger than S2 and S2 is less than S1, for a range S3/S1 of approximately 0.04–0.1, an approximate loss of 10–14 dB, a compensation of approximately 6 dB, selecting the pre-emphasis filter with index 3 (220); K) if S3 is larger than S2 and S2 is less than S1, for a range S3/S1 of approximately 0.016–0.040, an approximate loss of 14–18 dB, a compensation of approximately 8 dB, selecting the pre-emphasis filter with index 4 (222); L) if S3 is larger than S2 and S2 is less than S1, for a range S3/S1 of approximately 0.016 and less, an approximate loss of at least 18 dB, a compensation of approximately 10 dB, selecting the pre-emphasis filter with index 5 (224); and M) if S3 is less than S2, selecting the pre-emphasis filter with index 0 (226).

Figure 3:
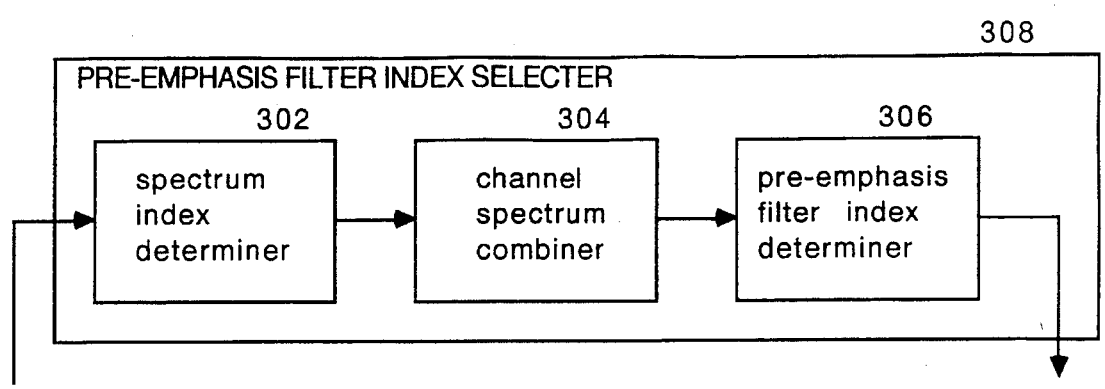
FIG. 3 is a block diagram of a digital signal processing module for selecting a pre-emphasis filter index in a line probing modem having a channel characteristic spectrum measurement for each of a plurality of predetermined pairs of carrier frequencies and baud rates in accordance with the present invention.

FIG. 3, numeral 300, is a block diagram of a digital signal processing module for selecting a pre-emphasis filter index in a line probing modem having a channel characteristic spectrum measurement for each of a plurality of predetermined pairs of carrier frequencies and baud rates in accordance with the present invention. The digital signal processing module includes: A) a spectrum index determiner for selecting at least three corresponding channel spectrum indexes based on an input carrier frequency and a baud rate (302), B) a channel spectrum combiner, operably coupled to the index determiner, for combining a channel spectrum for each of the channel spectrum indexes with the channel spectrum for at least two nearest neighbor spectrum indexes to provide corresponding combined spectrum values (304), and C) a pre-emphasis filter index determiner, operably coupled to the channel spectrum combiner, for determining a pre-emphasis filter index using a predetermined logic scheme based on the combined spectrum values (306).

Again, the typical predetermined pairs of carrier frequencies and baud rates, respectively, used by the digital signal processing module are: 1600 Hz, 2400 Hz; 1800 Hz, 2400 Hz; 1646 Hz, 2743 Hz; 1829 Hz, 2743 Hz; 1680 Hz, 2800 Hz; 1867 Hz, 2800 Hz; 1800 Hz, 3000 Hz; 2000 Hz, 3000 Hz; 1829 Hz, 3200 Hz; 1920 Hz, 3200 Hz; 1959 Hz, 3429 Hz. As described above, three line probing frequencies, a high frequency f1, a medium frequency f2, and a low frequency f3 are typically associated with each pair of carrier frequencies and baud rates.

Again, in the digital signal processing module, the channel spectra for each of the spectrum indexes and the channel spectra for at least two nearest neighbor spectrum indexes each typically comprise a predetermined channel response at the respective frequency that has been stored in a memory of a digital signal processing module. The channel spectrum combiner (404) in the digital signal processing module combines a channel spectrum for the spectrum index and at least the two nearest spectrum indexes to provide at least three combined values, S1, S2, and S3, and the predetermined logic scheme based on the combined values is as described above.

FIG. 4, numeral 400, is a block diagram of a digital communication system having a transmitter (402) and receiver (404) wherein the receiver (404) has a channel spectrum based pre-emphasis filter index selector comprising a digital signal processing module (406) for selecting a pre-emphasis filter index based on a channel spectrum measurement for each of a plurality of predetermined pairs of carrier frequencies and baud rates in accordance with the present invention. The digital signal processing module (406) includes a spectrum index determiner (408), a channel spectrum combiner (410), and a pre-emphasis filter index determiner (412) coupled and described more fully above.

FIG. 5, numeral 500, is a block diagram of a digital signal processing module for selecting a pre-emphasis filter in a line probing modem having a channel characteristic spectrum measurement for each of a plurality of predetermined pairs of carrier frequencies and baud rates. The digital signal processor includes a spectrum index determiner (502), a channel spectrum combiner (512), and a pre-emphasis filter index determiner (514). The spectrum index determiner includes a frequency calculator (504) and a spectrum index slicer (506). The frequency calculator (504) is used for calculating at least three frequencies using a predetermined scheme based on an input carrier frequency and a baud rate. The spectrum index slicer (506) is operably coupled to the frequency calculator and is used for selecting corresponding channel spectrum indexes. The channel spectrum combiner (508) is operably coupled to the spectrum index determiner and includes a combiner (510) and memory (512). The combiner (510) is operably coupled to the spectrum index slicer (506) and is used for combining each spectrum index indicated spectrum with at least two nearest neighbors to provide a corresponding combined spectrum value. The channel spectra which are used by the combiner are stored in the memory (512), which is operably coupled to the combiner (510). The pre-emphasis filter index determiner (514) is operably coupled to the combiner (510) and is used for determining, for each combination, one pre-emphasis index based on a predetermined logic scheme.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

I claim:

1. A method for selecting a pre-emphasis filter by a digital signal processing module in a line probing modem having at least a channel spectrum measurement, comprising the steps of:

for each of a plurality of predetermined pairs of carrier frequencies and baud rates, A) calculating at least three frequencies using a predetermined scheme based on an input carrier frequency and a baud rate, B) selecting, by a spectrum index determiner, channel spectrum indexes corresponding to the at least three frequencies using a predetermined scheme, C) combining, by a channel spectrum combiner, each of the channel spectra indicated by the spectrum indexes with at least two nearest neighbors to provide corresponding combined spectrum values, D) using, by a pre-emphasis filter index determiner, the combined spectrum values for determining a pre-emphasis filter index based on a predetermined logic scheme.

2. The method of claim 1 wherein the predetermined scheme comprises:

for determining three frequencies based on each of a plurality of predetermined pairs of carrier frequencies, $f_c$, and baud rates, Q, A) selecting a corresponding low frequency $f_1 = f_c - \beta*Q/2$, where $\beta$ is a predetermined scaling factor, B) selecting a corresponding medium frequency $f_2 = f_c$, c) selecting a corresponding high frequency $f_3 = f_c + \beta*Q/2$.

3. The method of claim 2 wherein, for low, medium and high frequency, a line probing frequency with the nearest value from the set {150 Hz, 300 Hz, 450 Hz, 600 Hz, 750 Hz, 900 Hz, 1050 Hz, 1200 Hz, 1350 Hz, 1500 Hz, 1650 Hz, 1800 Hz, 1950 Hz, 2100 Hz, 2250 Hz, 2400 Hz, 2550 Hz, 2700 Hz, 2850 Hz, 3000 Hz, 3150 Hz, 3300 Hz, 3450 Hz, 3600 Hz, 3750 Hz} is selected, and the corresponding channel spectrum index, according to a pattern of using 1 for 150 Hz, 2 for 300 Hz, . . . 25 for 3750 Hz, is determined as spectrum indexes i1, i2 and i3.

4. The method of claim 3 wherein, upon using a channel spectrum combiner for combining a characteristic spectrum for each of the channel spectrum indexes with the channel spectrum for at least two nearest neighbor spectrum indexes to provide corresponding combined spectrum values, including weighting summation of the channel spectrum for the spectrum index and at least the two nearest neighbot indexes to provide at least three combined values S1, S2, and S3.

5. The method of claim 4 wherein, the predetermined logic scheme based on the pre-emphasis value associated with each combined spectrum values comprises the following steps and wherein the values are predetermined ranges associated with S1, S2 and S3 as set forth in the following steps:

A) when S3 is larger than S2 and S2 is larger than S1, for a range S3/S2 of approximately 0.79 and greater, an approximate loss of 0–1 dB, a compensation of approximately 0 dB, selecting the pre-emphasis filter with index 0;

B) when S3 is larger than S2 and S2 is larger than S1, for a range S3/S2 of approximately 0.5–0.79, an approximate loss of 1–3 dB, a compensation of approximately 1 dB, selecting the pre-emphasis filter with index 6;

C) when S3 is larger than S2 and S2 is larger than S1, for a range S3/S2 of approximately 0.32–0.50, an approximate loss of 3–5 dB, a compensation of approximately 2 dB, selecting the pre-emphasis filter with index 7;

D) when S3 is larger than S2 and S2 is larger than S1, for a range S3/S2 of approximately 0.20–0.32, an approximate loss of 5–7 dB, a compensation of approximately 3 dB, selecting the pre-emphasis filter with index 8;

E) when S3 is larger than S2 and S2 is larger than S1, for a range S3/S2 of approximately 0.13–0.20, an approximate loss of 7–9 dB, a compensation of approximately 4 dB, selecting the pre-emphasis filter with index 9;

F) when S3 is larger than S2 and S2 is larger than S1, for a range S3/S2 of approximately 0.13 and less, an approximate loss of at least 9 dB, a compensation of at least 5 dB, selecting the pre-emphasis filter with index 10;

G) when S3 is larger than S2 and S2 is less than S1, for a range S3/S1 of approximately 0.63 and greater, an approximate loss of 0–2 dB, a compensation of approximately 0 dB, selecting the pre-emphasis filter with index 0;

H) when S3 is larger than S2 and S2 is less than S1, for a range S3/S1 of approximately 0.25–0.63, an approximate loss of 2–6 dB, a compensation of approximately 2 dB, selecting the pre-emphasis filter with index 1;

I) when S3 is larger than S2 and S2 is less than S1, for a range S3/S1 of approximately 0.1–0.25, an approximate loss of 6–10 dB, a compensation of approximately 4 dB, selecting the pre-emphasis filter with index 2;

J) when S3 is larger than S2 and S2 is less than S1, for a range S3/S1 of approximately 0.04–0.1, an approximate loss of 10–14 dB, a compensation of approximately 6 dB, selecting the pre-emphasis filter with index 3;

K) when S3 is larger than S2 and S2 is less-than S1, for a range S3/S1 of approximately 0.016–0.040, an approximate loss of 14∝18 dB, a compensation of approximately 8 dB, selecting the pre-emphasis filter with index 4;

L) when S3 is larger than S2 and S2 is less than S1, for a range S3/S1 of approximately 0.016 and less, an approximate loss of at least 18 dB, a compensation of approximately 10 dB, selecting the pre-emphasis filter with index 5; and M) when S3 is less than S2, selecting the pre-emphasis filter with index 0.

6. A digital signal processing module for selecting a pre-emphasis filter index in a line probing modem having a channel characteristic spectrum measurement for each of a plurality of predetermined pairs of carrier frequencies and baud rates, comprising:

A) a spectrum index determiner for selecting corresponding channel spectrum indexes based on an input carrier frequency and a baud rate, B) a channel spectrum combiner, operably coupled to the spectrum index determiner, for combining a channel spectrum for each channel spectrum index with a channel spectrum for at least two nearest neighbor channel spectrum indexes to provide corresponding combined spectrum values, C) a pre-emphasis filter index determiner, operably coupled to the channel spectrum combiner, for determining a pre-emphasis filter index using a predetermined logic scheme based on combined spectrum values.

7. The digital signal processing module of claim 6 wherein the spectrum index determiner for selecting corresponding channel spectrum indexes based on an input carrier frequency and a baud rate is utilized for determining three frequencies based on each of a plurality of predetermined pairs of carrier frequencies, $f_c$, and baud rates, Q, by selecting a corresponding low frequency $f_1=f_c-b*Q/2$, where b is a predetermined scaling factor, selecting a corresponding medium frequency $f_2=f_c$, and selecting a corresponding high frequency $f_3= f_c+b*Q/2$.

8. The digital signal processing of claim 7 wherein, for low, medium and high frequency, a line probing frequency with the nearest value from the set { 150 Hz, 300 Hz, 450 Hz, 600 Hz, 750 Hz, 900 Hz, 1050 Hz, 1200 Hz, 1350 Hz, 1500 Hz, 1650 Hz, 1800 Hz, 1950 Hz, 2100 Hz, 2250 Hz, 2400 Hz, 2550 Hz, 2700 Hz, 2850 Hz, 3000 Hz, 3150 Hz, 3300 Hz, 3450 Hz, 3600 Hz, 3750 Hz} is selected, and the corresponding channel spectrum index, according to a pattern of using 1 for 150 Hz, 2 for 300 Hz, . . . 25 for 3750 HZ, is determined as spectrum indexes i1, i2 and i3.

9. The digital signal processing module of claim 8 wherein, upon using a channel spectrum combiner for combining a characteristic spectrum for each of the channel spectrum indexes with the channel spectrum for at least two nearest neighbor spectrum indexes to provide corresponding combined spectrum values, including weighting summation of the channel spectrum for the spectrum index and at least the two nearest neighbot indexes to provide at least three combined values S1, S2, and S3.

10. The digital signal processing module of claim 9 wherein, the predetermined logic scheme based on the pre-emphasis value associated with each combined spectrum values provides the following pre-emphasis filter selections and wherein the values are predetermined ranges associated with S1, S2 and S3 as set forth in the following steps:

A) when S3 is larger than S2 and S2 is larger than S1, for a range S3/S2 of approximately 0.79 and greater, an approximate loss of 0–1 dB, a compensation of approximately 0 dB, selecting the pre-emphasis filter with index 0;

B) when S3 is larger than S2 and S2 is larger than S1, for a range S3/S2 of approximately 0.5–0.79, an approximate loss of 1–3 dB, a compensation of approximately 1 dB, selecting the pre-emphasis filter with index 6;

C) when S3 is larger than S2 and S2 is larger than S1, for a range S3/S2 of approximately 0.32–0.50, an approximate loss of 3–5 dB, a compensation of approximately 2 dB, selecting the pre-emphasis filter with index 7;

D) when S3 is larger than S2 and S2 is larger than S1, for a range S3/S2 of approximately 0.20–0.32, an approximate loss of 5–7 dB, a compensation of approximately 3 dB, selecting the pre-emphasis filter with index 8;

E) when S3 is larger than S2 and S2 is larger than S1, for a range S3/S2 of approximately 0.13–0.20, an approximate loss of 7–9 dB, a compensation of approximately 4 dB, selecting the pre-emphasis filter with index 9;

F) when S3 is larger than S2 and S2 is larger than S1, for a range S3/S2 of approximately 0.13 and less, an approximate loss of at least 9 dB, a compensation of at least 5 dB, selecting the pre-emphasis filter with index 10;

G) when S3 is larger than S2 and S2 is less than S1, for a range S3/S1 of approximately 0.63 and greater, an approximate loss of 0–2 dB, a compensation of approximately 0 dB, selecting the pre-emphasis filter with index 0;

H) when S3 is larger than S2 and S2 is less than S1, for a range S3/S1 of approximately 0.25–0.63, an approximate loss of 2–6 dB, a compensation of approximately 2 dB, selecting the pre-emphasis filter with index 1;

I) when S3 is larger than S2 and S2 is less than S1, for a range S3/S1 of approximately 0.1–0.25, an approximate loss of 6–10 dB, a compensation of approximately 4 dB, selecting the pre-emphasis filter with index 2;

J) when S3 is larger than S2 and S2 is less than S1, for a range S3/S1 of approximately 0.04–0.1, an approximate loss of 10–14 dB, a compensation of approximately 6 dB, selecting the pre-emphasis filter with index 3;

K) when S3 is larger than S2 and S2 is less than S1, for a range S3/S1 of approximately 0.016–0.040, an approximately loss of 14–18 dB, a compensation of approximately 8 dB, selecting the pre-emphasis filter with index 4;

L) when S3 is larger than S2 and S2 is less than S1, for a range S3/S1 of approximately 0.016 and less, an approximate loss of at least 18 dB, a compensation of approximately 10 dB, selecting the pre-emphasis filter with index 5; and M) when S3 is less than S2, selecting the pre-emphasis filter with index 0.

11. A digital communication system having a transmitter and a receiver wherein the receiver has a characteristic spectrum based pre-emphasis filter selector comprising a digital signal processing module for selecting a pre-emphasis filter based on a channel characteristic spectrum measurement for each of a plurality of predetermined pairs of carrier frequencies and baud rates, comprising:

A) a spectrum index determiner for selecting corresponding spectrum indexes based on an input carrier frequency and an input baud rate, B) a channel spectrum combiner, operably coupled to the index determiner, for combining a channel spectrum for each of the spectrum indexes with the channel spectrum for at least two nearest neighbor indexes to provide corresponding combined spectrum values, C) a pre-emphasis filter index determiner, operably coupled to the combiner, for determining a pre-emphasis filter index using a predetermined logic scheme based on the combined spectrum values.

12. The digital communication system of claim 11 wherein the a spectrum index determiner for selecting corresponding spectrum indexes based on an input carrier frequency and an input baud rate determines three frequencies based on each of a plurality of predetermined pairs of carrier frequencies, $f_c$, and baud rates, Q, by selecting a corresponding low frequency $f_1 = f_c - b*Q/2$, where b is a predetermined scaling factor, selecting a corresponding medium frequency $f_2 = f_c$, and selecting a corresponding high frequency $f_3 = f_c + b*Q/2$.

13. The digital communication system of claim 12 wherein, for low, medium and high frequency, a line probing frequency with the nearest value from the set { 150 Hz, 300 Hz, 450 Hz, 600 Hz, 750 Hz, 900 Hz, 1050 Hz, 1200 Hz, 1350 Hz, 1500 Hz, 1650 Hz, 1800 Hz, 1950 Hz, 2100 Hz, 2250 Hz, 2400 Hz, 2550 Hz, 2700 Hz, 2850 Hz, 3000 Hz, 3150 Hz, 3300 Hz, 3450 Hz, 3600 Hz, 3750 Hz} is selected, and the corresponding channel spectrum index, according to a pattern of using 1 for 150 Hz, 2 for 300 Hz, . . . 25 for 3750 Hz, is determined as spectrum indexes i1, i2 and i3.

14. The digital communication system of claim 13 wherein, upon using a channel spectrum combiner for combining a characteristic spectrum for each of the channel spectrum indexes, with the channel spectrum for at least two nearest neighbor spectrum indexes to provide corresponding combined spectrum values, S1, S2, and S3.

15. The digital communication system of claim 14 wherein, the predetermined logic scheme based on the pre-emphasis filter value associated with each combined spectrum values comprises the following steps and wherein the values are predetermined ranges associated with S1, S2 and S3 as set forth in the following steps:

A) when S3 is larger than S2 and S2 is larger than S1, for a range S3/S2 of approximately 0.79 and greater, an approximate loss of 0–1 dB, a compensation of approximately 0 dB, selecting the pre-emphasis filter with index 0;

B) when S3 is larger than S2 and S2 is larger than S1, for a range S3/S2 of approximately 0.5–0.79, an approximate loss, of 1–3 dB, a compensation of approximately 1 dB, selecting the pre-emphasis filter with index 6;

C) when S3 is larger than S2 and S2 is larger than S1, for a range S3/S2 of approximately 0.32–0.50, an approximate loss of 3–5 dB, a compensation of approximately 2 dB, selecting the pre-emphasis filter with index 7;

D) when S3 is larger than S2 and S2 is larger than S1, for a range S3/S2 of approximately 0.20–0.32, an approximate loss of 5–7 dB, a compensation of approximately 3 dB, selecting the pre-emphasis filter with index 8;

E) when S3 is larger than S2 and S2 is larger than S1, for a range S3/S2 of approximately 0.13–0.20, an approximate loss of 7–9 dB, a compensation of approximately 4 dB, selecting the pre-emphasis filter with index 9;

F) when S3 is larger than S2 and S2 is larger than S1, for a range S3/S2 of approximately 0.13 and less, an approximate loss of at least 9 dB, a compensation of at least 5 dB, selecting the pre-emphasis filter with index 10;

G) when S3 is larger than S2 and S2 is less than S1, for a range S3/S1 of approximately 0.63 and greater, an approximate loss of 0–2 dB, a compensation of approximately 0 dB, selecting the pre-emphasis filter with index 0;

H) when S3 is larger than S2 and S2 is less than S1, for a range S3/S1 of approximately 0.25–0.63, an approximate loss of 2–6 dB, a compensation of approximately 2 dB, selecting the pre-emphasis filter with index 1;

I) when S3 is larger than S2 and S2 is less than S1, for a range S3/S1 of approximately 0.1–0.25, an approximate loss of 6–10 dB, a compensation of approximately 4 dB, selecting the pre-emphasis filter with index 2;

J) when S3 is larger than S2 and S2 is less than S1, for a range S3/S1 of approximately 0.04–0.1, an approximate loss of 10–14 dB, a compensation of approximately 6 dB, selecting the pre-emphasis filter with index 3;

K) when S3 is larger than S2 and S2 is less than S1, for a range S3/S1 of approximately 0.016–0.040, an approximate loss of 14–18 dB, a compensation of approximately 8 dB, selecting the pre-emphasis filter with index 4;

L) when S3 is larger than S2 and S2 is less than S1, for a range S3/S1 of approximately 0.016 and less, an approximate loss of at least 18 dB, a compensation of approximately 10 dB, selecting the pre-emphasis filter with index 5; and M) when S3 is less than S2, selecting the pre-emphasis filter with index 0.

* * * * *